United States Patent [19]

Bertorelli

[11] 3,784,392

[45] Jan. 8, 1974

[54] PRODUCTION OF FINELY DIVIDED AMORPHOUS ALUMINO-SILICATE PIGMENTS FROM KAOLIN

[75] Inventor: Orlando Leonard Bertorelli, Havre de Grace, Md.

[73] Assignee: J. M. Huber Corporation, Locust, N.J.

[22] Filed: Apr. 29, 1971

[21] Appl. No.: 138,791

[52] U.S. Cl. ............ 106/288 B, 23/110 R, 106/72, 106/73
[51] Int. Cl. ................................................ C09c 1/00
[58] Field of Search .................. 106/288 B, 72, 73; 23/110 R, 111, 112 R, 110 P

[56] References Cited
UNITED STATES PATENTS

| | | | |
|---|---|---|---|
| 2,742,345 | 4/1956 | Kloepfer et al. ................ | 23/110 R |
| 2,981,599 | 4/1961 | Schrauf et al. ................... | 23/110 R |
| 2,268,131 | 12/1941 | Barker et al. ..................... | 106/72 |
| 2,955,051 | 10/1960 | Maloney ........................... | 106/72 X |
| 2,995,458 | 8/1961 | Murray ............................. | 106/288 B |
| 3,205,082 | 9/1965 | Buffett ............................. | 106/288 B X |
| 3,224,892 | 12/1965 | Hemstock ......................... | 106/288 B |

Primary Examiner—Daniel E. Wyman
Assistant Examiner—H. M. S. Sneed
Attorney—Harold H. Flanders and Michael Jon Caddell

[57] ABSTRACT

A method for preparing finely divided alumino silicate pigments of increased brightness from refined kaolinic materials is disclosed. The method involves the hydrothermal treatment of an aqueous dispersion of refined kaolins or kaolinic pigments and an alkaline earth metal hydroxide. The products have particular utility as high grade paper coating pigments.

4 Claims, No Drawings

PRODUCTION OF FINELY DIVIDED AMORPHOUS ALUMINO-SILICATE PIGMENTS FROM KAOLIN

BACKGROUND OF THE INVENTION

1. Field of the Invention

This invention relates to inorganic pigments, and more particularly to the production of finely divided, alumino silicate pigments by the hydrothermal treatment of refined kaolin clay pigments.

2. Description of the Prior Art

As is well known in the art, the processing or refining of kaolin clays is accomplished by two basic techniques. The first is generally referred to as the "dry process" or air-flotation process whereas the second is the "wet process" wherein classification is effected in a water suspension. In the former or dry process, separation of the coarse particles and impurities is effected by pulverizing the dried crude clay and thereafter lifting the particles of the desired fineness from the grinding chambers by air currents. The second basic technique, or "wet process" is somewhat more complex than the dry process and generally involves the separation of water suspended clay fractions within certain controlled particle size ranges, followed by the bleaching of the clay fractions by chemical means and filtration and drying of the product.

To a considerable extent the value of kaolin clay pigments in many applications, such as pigments for coating paper, reinforcing pigments for rubber compounds, etc., depends upon the color or brightness of the pigment as well as the particle size or range thereof, the latter being generally identified by the percentage, by weight, of the particles above and below 2 microns. As known, clays are graded according to their brightness as determined in accordance with TAPPI tentative standard T 646-M-54.

In recent years, the processing or refining of kaolin clays by either the "wet" or "dry" process has been developed to the extent such that the competition between the products is very keen. However, while kaolin clay pigments produced from the dry process are less expensive than pigments produced by the wet process, their use in several applications, particularly as high grade paper coating pigments, has been limited. This is true, notwithstanding the fact that wet processed clay pigments are more expensive, have a higher moisture content and generally produce more viscous paper coating mixtures.

The present invention is directed to improving the properties of refined kaolin clay pigments, particularly those produced by the aforementioned processes such that the pigments produced may be used in applications considered heretofore impractical.

BRIEF SUMMARY OF THE INVENTION

In summary, the present invention provides a highly efficient and simplified process for producing finely divided, alumino silicate pigments of increased brightness from refined kaolin clay pigments. While the unique products of the invention may be used in many application, such as extenders for paints, fillers for rubber compounds and the like, they have particular utility, due to their high brightness, for use in coating paper. The invention is based on the unexpected discovery that the hydrothermal treatment of refined kaolin clay pigments, as to be described in detail hereinafter, with the alkaline earth metal hydroxide of Group IIa of the Periodic Table, particularly those in the fourth and higher periods (i.e., with atomic numbers greater than 19), effects the transformation of the starting material into amorphous, non-crystalline alumino-silicate pigments of increased brightness. Broadly speaking, in accordance with the method of the invention, an aqueous suspension of refined kaolin clay pigments and an alkaline earth metal hydroxide is subjected to hydrothermal treatment under controlled conditions of temperature, pressure and time, to effect substantially complete reaction between the reactive components. Thus the present invention provides a simplified process for producing a high grade paper coating pigment of increased brightness from relatively inexpensive refined kaolin clay pigments, produced from the above described processes.

It is accordingly a general object of this invention to provide a finely divided amorphous, alkaline earth metal aluminum silicate of high brightness and a unique process for preparing same.

Another and more particular object is to provide a method for preparing alumino silicate pigments of increased brightness by the hydrothermal treatment of refined kaolin clay pigments.

Yet another object is to provide novel alkaline earth metal alumino silicate pigments from hydrous aluminum silicate pigments, comprising predominately the mineral kaolinite, which has particular utility for use in coating paper.

The manner in which the foregoing and other objects are achieved in accordance with the present invention will be better understood in view of the following detailed description wherein particularly advantageous method and composition embodiments are disclosed for illustrative purposes.

DESCRIPTION OF PREFERRED EMBODIMENT(S)

As generally discussed above, the present invention is based on the discovery that amorphous non-crystalline alumino silicate pigments of increased brightness can be produced by the hydrothermal treatment of refined kaolin clay pigments with selected hydroxides of the alkaline earth metals of Group IIa of the Periodic Table. These include the hydroxides of the alkaline earth metals of Group IIa in the fourth and higher periods (i.e., with atomic numbers greater than 19), specifically, calcium, strontium, barium and radium. In its broadest aspects, the method of the invention comprises forming an aqueous dispersion of a refined kaolin clay pigment and an alkaline earth metal hydroxide and thereafter subjecting the dispersion to hydrothermal treatment under controlled conditions of temperature and pressure for a period of time to effect reaction between the pigment and the hydroxide. In this matter, and that upon which the instant invention is based, the brightness of the refined kaolin clay pigment employed as the starting material is converted into a product having a brightness from about 10 to 12 points higher than the said starting material. This is truly unexpected.

In this regard and as is known in the art, kaolin clay is a hydrous aluminum silicate which may be represented by the empirical formula:

$Al_2O_3 \cdot 2\ SiO_2 \cdot 2\ H_2O$

As used herein the term "refined kaolin clay pigment" includes those pigments which contain predominately the mineral kaolinite, are free from impurities, such as bentonite clay, and have a particle size such that at least 60 percent by weight are less than two microns. In a particularly advantageous embodiment of the present invention, the refined kaolinic pigment employed as the starting material is produced by either the dry or wet flotation processes and has a moisture content of less than 27, a GE brightness on the order of 78 – 80, and a particle size range wherein about 60 – 70 percent by weight are leass than 2 microns and about 10 – 15 percent, by weight, are greater than 5 microns. As briefly discussed above, it has been discovered that in practicing the method of the invention, the brightness of the starting material is increased from about 10 – 12 points. Thus when employing an air flotation produced pigment having a brightness on the order of about 80, there is produced a pigment which has a brightness of at least 90. Products produced from a coarse water fractionated kaolin may show certain advantages in specific paper applications.

Turning now to the more specific details, it has been found that the quantity of the alkaline earth metal hydroxide employed is significant and should be on the order of at least 1 mole per mole of the clay pigment employed. In other words the mole ratio of the alkaline earth hydroxide to the kaolinic pigment must be at least 1:1 and may be as great as 5:1.

In this regard it has been found to be particularly advantageous to employ less than the theoretical amount of the kaolinic pigment. A particularly preferred molar ratio of the hydroxide to the clay is 1:3/4. In general the overall reaction involved may be summarized as follows:

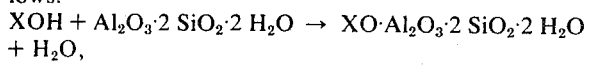

wherein X is an alkaline earth metal selected from the fourth or higher periods of Group IIa of the Periodic Table.

In addition to the concentration of the reactants, it has been found that the process variables that are significant in the practicing of the invention include the reaction temperature, reaction time and pH of the reaction mass. In this regard, the hydrothermal treatment of the dispersion of the refined pigment and hydroxide is preferably conducted at temperatures in the range of about 100° C. to 200° C., with particularly advantageous results being obtained at temperatures between 100° C. to 180° C. While the optimum reaction temperatures will vary slightly depending upon the particular hydroxide employed, the above discussed temperature ranges are required to obtain a pigment of the desired brightness.

To a considerable extent, the reaction time is a function of the temperature employed. However to obtain a pigment having a brightness greater than about 10 to 12 points higher than the starting material, a reaction period of at least about 1 – 2 hours is required. As indicated, the pH of the reaction mass is critical. Suitable pH ranges are from about 8 – 12 with a preferred range on the order of from about 10 to 12. The reaction is substantially complete when the reaction pH is lowered from a pH on the order of 12 to a pH on the order of 10, preferably 10.5.

In practicing the method of the invention, the hydrothermal treatment of the aqueous dispersion of the refined kaolinic pigment and alkaline earth metal hydroxide is effected in a closed vessel at the above indicated temperatures, i.e., 100°– 200° C., and under the elevated pressures obtained at such temperatures. As known, the hydrothermal treatment of clays or clay-type pigments may be effected, for example, by the introduction of steam in the jacket of the vessel being employed or by the direct introduction of high pressure steam into the reactor. Any suitable pressurized equipment provided with means for maintaining the aqueous suspension or dispersion under high agitation and/or provided with means for controlling the introduction of pressurized steam, etc. may be employed. Examples of such techniques are disclosed in U.S. Pat. Nos. 3,033,648 and 3,115,391. In this regard, it has been heretofore proposed to treat clays or siliceous pigments hydrothermally in the presence of various materials, including calcuium hydroxide. Such a process is disclosed, e.g., in U.S. Pat. No. 2,742,345 to Klopfer et al. In this patent there is disclosed a method for converting a bentonite clay into a finely divided product of low builk density by autoclaving an aqueous suspension of bentonite and calcium hydroxide at a temperature in the range of 150° to 250° C. However, as will be readily appreciated by those skilled in the art, the present invention is clearly distinguishable over the process disclosed by the aforementioned patent, as well as other known processes, both in the nature of the starting materials or pigments employed and in the discovery that a processed clay may be converted into high grade paper coating pigments of increased brightness.

Again considering the details of the invention, in treating solids hydrothermally, an aqueous slip or slurry of the particulate matter is employed. In accordance with the present invention, the concentration of the slurry is not critical and may vary widely. Thus the percent solids may vary from about 10 to 50 percent. Slurries less concentrated than 10 percent are not recommended for practical reasons whereas slurries more concentrated than 50 percent by weight solids are difficult to pump and therefore are also not recommended. Preferable slurry concentrations are about 15 – 40 percent by weight solids. If the anhydrous form of the alkaline earth metal hydroxide is not employed, the amount of water present in the solution of the hydroxide should be considered when preparing a slurry of any given solids content.

As discussed in detail above, the refined kaolin pigments which are suitable for the invention are those that contain as a principle constituent the mineral kaolinite. A particularly advantageous kolin pigment that may be used in the present invention is an air floated hydrous aluminum silicate sold under the trademark "HI-WHITE" by J. M. Huber Corporation. However, other air flotation produced pigments and clays such as those sold under the trademark "SUPREX" may be employed.

Water fractionated kaolins, such as a coarse water fractionated Georgia kaolin having 30 – 40 percent of its particle size distribution finer than 2 microns and sold under the trade designation CWF by the J. M. Huber Corporation, may be employed. Other water fractionated kaolins such as Georgia kaolins having 92 – 95 percent and 80 – 82 percent of their particles less than 2 microns and sold respectively under the trademarks "HYDRAGLOSS" and "HYDRASPERSE" by the J. M. Huber Corporation may be successfully employed in the process of the present invention.

The invention will be further illustrated by the following examples which set forth particularly advantageous method embodiments. While the examples serve to illustrate the invention they are not intended to limit it thereto.

EXAMPLE I

One mole of calcium hydroxide $Ca(OH)_2$ — 74.1 grams — was slurried and dispersed in 1,400 mls. of distilled water in a 2 liter Parr pressure reactor. Three-quarter (189 g) mole of "HI-WHITE" (Registered Trademark) clay was slurried into the calcium hydroxide slurry until well dispersed. The concentration of the resulting slurry was approximately 18 percent by weight solids. The reactor was sealed and heated while under strong agitation at approximately 140° C. for 90 minutes. The reaction mass was maintained at a pH of about 11 – 12. At the end of this reaction period, the slurry was cooled to room temperature, removed from the reactor, and filtered. The filter cake was washed with distilled water to remove free calcium hydroxide and was then dried. The yield from the reaction was found to be 210.0 grams. The product had a GE brightness of 90, an increase of 10 points above the "HI-WHITE" employed as the starting material.

EXAMPLE II

The procedure of Example I was repeated except the reaction was maintained at a temperature of 177° C. for a two hour period. The GE brightness of the product was found to be 92.0.

EXAMPLE III

The general procedure of Example I was repeated in a series of five (5) test runs except that one mole of barium hydroxide, radium hydroxide, and strontium hydroxide were substituted for the calcium hydroxide of Example I. The reaction product for each test consisted of amorphous non-crystalline particulates having a GE brightness on the order of about 90.

EXAMPLE IV

The procedures of Examples I and III were repeated except that in a series of tests the reaction temperatures were varied from 20° C. (by increments of 30° C.) to 200° C. An increase in brightness (over the starting material) on the order of 5 – 8 points was effected at temperatures on the order of 20°– 100° C. However at temperatures in the range from 100°– 200° C. an increase in brightness of 10 – 12 points was obtained. In a series of further tests, the reaction temperature was maintained constant (at 150° C.) with the reaction period being varied from 1 hour to 2 hours (by increments of 20 minutes). The increase of brightness of the product for a 1 hour period versus the 2 hour period was approximately 4 points.

As extablished by the above Examples, the unique finely divided alumino silicates of the present invention have a brightness on the order of about 10 – 12 points higher than the starting material employed. Specific properties of the product include: Specific Gravities of about 2.0 to 2.5, Pack Density of about 10 lbs/cubic ft. to about 15 lbs/cubic ft., and surface areas of about 10 – 15 $m^2/g$.

EXAMPLE V

In this Example, the product of the invention was compared with a wet processed paper coating pigment sold under the trademark "HYDRATEX" by J. M. Huber Corporation and the "HI-WHITE" pigment of Example I that was not hydrothermally treated. The tests were conducted on a coated magazine grade in accordance with the following procedure.

Coating mixture — 62 percent total solids. 80.05 parts Stayco M and 6.9 parts Dow Latex 169 per 100 parts pigment.

Rawstock — 51 lbs. basis weight from Mead Paper Company, Kingsport, Tennessee.

Coating — 7 lbs. applied to wire side only by trailing blade on Keegan Coater.

Calendering — 4 nips at 1,500 p. l. i.

The effect of the treatments on the magazine coated grade is shown in Table I.

TABLE I

| | VISCOSITY OF COATING MIXTURES | | COATED PAPERS - 7 LB. COATING | | | |
|---|---|---|---|---|---|---|
| | Solids % | Brookfield 20 RPM Cps. | Gloss % | Opacity % | GE Brightness | Printability |
| HI-WHITE (not hydrothermal treated) | 62 | 6200 | 50.0 | 92.82 | 80.0 | 60 |
| PRODUCT OF EXAMPLE I | 62 | 6200 | 59.1 | 91.62 | 90.0 | 70 |
| HYDRATEX | 62 | 6500 | 59.0 | 91.00 | 88.0 | 70 |

In general it has been found preferable to react calcium and strontium hydroxides with kaolin in greater than equi-molar ratios. Barium and radium hydroxides react hydrothermally in an equi-molar ratio with kaolin.

The hydrothermal reaction of calcium hydroxide on kaolin is substantially complete in approximately one hour, in a process starting at room temperature and reacting at a steam pressure of 120 – 125 psig. However, other pigment properties desired for specific applications, as for example in the paper industry, such as pH, wet cake moisture, and dry brightnesses may require a total reaction time on the order of 4 hours to complete the morphological changes necessary to insure the desired properties.

Study has shown that calcium hydroxide reacts hydrothermally with kaolin in a molar weight ratio slightly greater than the expected 1:1. For many applications, based on the reactivity of calcium hydroxide to kaolin, a molar ratio on the order of 4 or 5 to 1 may be preferred and may produce additional brightness increases.

As indicated above the alumino silicate pigments of the present invention may be made from any of a number of kaolinic materials. It is desirable that such clays have a G. E. meter brightness value on the order of 80.

Lime hydrates or freshly slaked $Ca(OH)_2$ prepared from quick lime may each be employed in the process of the present invention. It is desirable, however, that the G. E. meter brightness of the lime hydrate be at least 93.0.

Chemically treated and brightened clays may, of course, be employed in the execution of the present invention, if desired.

A low level of grit in both the clays and lime hydrates employed is desirable.

The following example is provided as a typical procedure employed in the execution of the present invention.

EXAMPLE VI

Seven-hundred fifty pounds of calcium alumino silicate was prepared from 135 pounds of quick lime, 598 pounds of a water fractionated Georgia kaolin, and 637 gallons of water.

The quick lime was slaked with water to give a smooth paste and allowed to age for approximately two hours. After aging the paste was thinned by the addition of water up to the 637 gallons required and pumped through a 40 mesh screen into an 800 gallon autoclave.

The clay was slurried directly into the 800 gallon autoclave containing the lime slurry to produce a slurry with a solids content of 1.3 pounds per gallon. After thoroughly dispersing 598 pounds of clay, the reactor was sealed and steam heated for 1 hour to achieve a steam pressure of 120 psig.

The reaction time was measured beginning from this point (i.e.: 120 psig at the end of 1 hour). The maximum pressure was attained after one hour of reaction time (i.e.: 2 hours of total heating).

After five hours of reaction time (total 6 hours heating) the steam was turned off and the slurry cooled.

The reaction product was filtered on a rotary filter to produce a wet cake with moisture of 72 percent and a solids content of 2.7 pounds per gallon, and then dried in a gas fired tray dryer.

The dried product was ground in a hammermill and packaged.

EXAMPLE VII

A clay-lime hydrate slurry of the same preparation and concentration as Example VI was prepared. A sample of the well-mixed parent slurry was taken directly from the reactor before heating was begun. During the course of treatment a sample of slurry was withdrawn every one-half hour up to and including the two hour reaction period. At the end of this period, a sample was withdrawn every hour for an additional three hour period. All samples obtained were filtered, dried and analyzed including X-ray diffraction analysis.

The results are summarized in Table II below.

TABLE II

EFFECTS OF REACTION TIME ON PROPERTIES OF CALCIUM ALUMINO SILICATE MADE FROM CLACIUM HYDRATE AND WATER FRACTIONATED CLAY

| Reaction Time (Hours) | Reactor Pressure (PSIG) | Filter Cake Moisture % | Reaction Slurry pH | Brightness (G.E.) | 20% Pigment pH | Lime Content by XRD |
|---|---|---|---|---|---|---|
| 0 | 0 | 37.0 | 12.5 | 84.7 | 11.9 | All present |
| ½ | 30 | 37.0 | 12.4 | 84.7 | 11.9 | All present |
| 1 | 122 | 68.7 | 12.4 | 83.0 | 11.8 | Trace |
| 1½ | 134 | 71.0 | 12.3 | 83.5 | 11.4 | None |
| 2 | 136 | 71.2 | 12.1 | 83.6 | 11.2 | None |
| 3 | 136 | 71.2 | 12.0 | 84.1 | 11.1 | None |
| 4 | 136 | 71.2 | 11.8 | 85.4 | 10.8 | None |
| 5 | 136 | 71.2 | 11.7 | 85.5 | 10.8 | None |

EXAMPLE VIII

The same procedures were followed as in Example VII for a calcium alumino silicate made from slaked calcium oxide and a water fractionated clay. The results are shown in Table III below.

TABLE III

EFFECTS OF REACTION TIME ON PROPERTIES OF CALCIUM ALUMINO SILICATE MADE FROM SLAKED CALCIUM OXIDE AND WATER FRACTIONATED CLAY

| Reaction Time (Hours) | Reactor Pressure (PSIG) | Filter Cake Moisture % | Reaction Slurry pH | Brightness (G.E.) | 20% Pigment pH | Lime Content by XRD |
|---|---|---|---|---|---|---|
| 0 | 0 | 32.9 | 11.9 | 83.5 | 12.4 | All present |
| ½ | 90 | 60.0 | 11.9 | 83.7 | 12.4 | ½ present |
| 1 | 120 | 66.8 | 11.8 | 83.8 | 12.3 | Trace |
| 1½ | 132 | 68.6 | 11.7 | 84.0 | 11.1 | None |
| 2 | 136 | 68.7 | 11.6 | 84.3 | 11.1 | None |
| 3 | 136 | 70.9 | 11.3 | 85.2 | 11.0 | None |
| 4 | 136 | 71.0 | 11.3 | 85.2 | 11.0 | None |
| 5 | 136 | 71.2 | 11.3 | 85.4 | 11.0 | None |
| 6 | 50 | 71.8 | 11.2 | 85.7 | 11.0 | None |

EXAMPLE IX

The number of moles of CaO used per mole of clay was varied in the process of Example VI. X-ray diffraction analysis results are shown in Table IV below. The chemical-physical properties of the calcium alumino silicates produced are shown in Table V below.

TABLE IV

| Mols of CaO Used per mol. of Clay | XRD Analysis of Reaction Product | |
|---|---|---|
| | % clay left | % Lime left |
| 5 | None | 20 |
| 4 | None | None |
| 3 | 10 | None |
| 2 | 40 | None |
| 1 | 60 | None |

TABLE V

| Ca(OH)$_2$ to Clay Mol Ratio | % LOI | 20% pH | Brightness | Oil Absorption (cc/100 g) | Valley Abrasion | Density, Pour | lbs./ft$^3$ Pack |
|---|---|---|---|---|---|---|---|
| 5 | 16.8 | 11.8 | 90.0 | 44 | 325 | 25.0 | 52 |
| 4 | 15.8 | 11.2 | 90.0 | 44 | 312 | 18.4 | 39 |
| 3 | 15.5 | 10.9 | 88.9 | 58 | 265 | 13.0 | 26 |
| 2 | 15.3 | 10.7 | 84.6 | 78 | 178 | 13.3 | 24 |
| 1 | 14.8 | 10.7 | 82.5 | 78 | 144 | 14.5 | 27 |

TABLE VI

PHYSICAL PROPERTIES OF CALCIUM ALUMINO SILICATE

| Clay Used | % Moisture | Specific Gravity | Oil Absorption cc/100 g | Density Lbs./ft.$^3$ Pour/Pack | Valley Abrasion | S/A m$^2$/g |
|---|---|---|---|---|---|---|
| Water Fractionated Kaolin | 1.2 | 2.53 | 63 | 17/33 | 68.5 | 31.5 |
| Air Floated Kaolin | 1.1 | 2.53 | 50 | 15/28 | 70 | 37.0 |

The calcium alumino silicates made from lime and clay is a fine particulate pigmentary material. Its morphological particle structure indicates that the lime has reacted on the surface of the clay crystal thus destroying its typical platelet particle shape. It is reactive to strong and weak acids such as carbonic and any of the mineral acids. With carbonic acid, a mixture of calcium carbonate and aluminum silicate results. With sulfuric acid, a mixture of CaSO$_4$ and aluminum silicates can be made. Both of these products can be considered as derivatives of calcium alumino silicate and pigmentary in nature.

With acids that produce a soluble calcium salt, a derivative can be made with the chemical composition of kaolin, a surface area of 65 m$^2$/g and an oil absorption of 120 mls/100 g. It can be classed as a reconstituted kaolin. This pigmentary product can be considered a derivative of calcium alumino silicate.

The calcium alumino silicate can be used as an acid scavenger for chemical materials which decompose to give off an acid such as hydrochloric from polyvinyl chloride. The product is water insoluble but soluble in acetic, hydrochloric and nitric acids.

Other pertinent properties of calcium alumino silicate made from an air floated and a water fractionated kaolin clay are listed below in Table VI. The low densities make them bulking type fine particulares.

Additional paper coating properties of the products of the present invention were determined using a publication paper coating color formulation with a starch base to make up the coating slip. The results are shown in Table VII below, using a 100 percent coating color of a delaminated coating clay sold under the trademark "NUCLAY" by Freeport Kaolin Company and coating slip of "NUCLAY" and "HI-OPAQUE" (a trademark of Freeport Kaolin Company for a partially calcined clay) in proportions as indicated below in Table VII as control materials. The products of the present invention are substituted on a pound for pound basis in the coating slip.

TABLE VII

PAPER COATING PROPERTIES
Color Properties

| Sample | % Solids | Brook-Vis. 20 RPM CPS | Hercules Vis. Dynes/ 1100 RPM |
|---|---|---|---|
| 100% Nuclay | 53 | 6800 | 13 |
| 92.5% Nuclay + 7.5% Hi-Opaque | 53 | 7300 | 13.7 |
| 7 ½% Calcium Alumino Silicate from air floted kaolin + 92.5% Nuclay | 53 | 7700 | 15.2 |
| 7 ½% Calcium Alumino Silicate made from water fractionated kaolin + 92.5% Nuclay | 53 | 8400 | 15.0 |

Coating Properties

| Sample | G. E. Brightness | 75° Gloss | B&L Opacity | Whiteness Factor | MAN Print Quality | Gloss Hold Out |
|---|---|---|---|---|---|---|
| 100% Nuclay | 71.1 | 36.1 | 83.4 | 54.2 | 55 | 48.1 |
| 92.5% Nuclay + 7.5% Hi-Opaque | 71.6 | 36.2 | 83.8 | 56.2 | 55 | 47.3 |
| 7 ½% Calcium Alumino Silicate from air floted kaolin + 92.5% Nuclay | 71.6 | 34.7 | 83.5 | 55.5 | 55 | 46.6 |
| 7 ½% Calcium Alumino Silicate made from water fractionated kaolin + 92.5% Nuclay | 72.1 | 37.0 | 84.3 | 57.3 | 56 | 49.5 |

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. The invention is declared to cover all changes and modifications of the specific example of the invention herein disclosed for purposes of illustration, which do not constitute departures from the spirit and scope of the invention.

What is claimed is:

1. An improved method for producing finely divided, amorphous alumino-silicate pigments of increased brightness and having particular utility for use in coating paper, said method comprising the steps of: forming an aqueous dispersion of a refined finely kaolin clay pigment comprising predominately the mineral kaolinite and having a GE brightness on the order of from about 70–80, a particle size range wherein about 60–70 percent, by weight, are less than 2 microns and about 10–15 percent, by weight, are greater than 5 microns; contacting said aqueous dispersion of the said finely divided refined kaolin pigment with a hydroxide of a metal having an atomic number greater than 19 and being selected from Group II–a of the Periodic Table, the molar ratio of said hydroxide to said kaolin pigment being at least 1:1, subjecting said dispersion to hydrothermal treatment at a temperature in the range of from about 100°C to 200°C for a period of time sufficient to convert said kaolin clay pigment into aluminosilicate pigments having a brightness of at least 10 to 12 points higher than that of said kaolin clay pigment and recovering the resulting product.

2. The method in accordance with claim 1 wherein the alkaline earth metal hydroxide is selected from the group consisting of calcium hydroxide, strontium hydroxide, barium hydroxide, and radium hydroxide, said method further comprising conducting said hydrothermal treatment at a temperature in the range of from about 100°C to about 180°C for a reaction period of not less than one hour.

3. A method for producing finely divided, amorphous alumino silicate pigment having increased brightness from a refined kaolin clay pigment produced by the air-flotation process, said method comprising the steps of: forming an aqueous dispersion of a refined kaolin clay pigment having a GE brightness of about 78–80, a particle size range where about 60–70 percent by weight are less than 2 microns and about 10–15 percent by weight are greater than 5 microns and a moisture content of less than about 27 percent, said refined kaolin clay being produced by the dry or air-flotation process; contacting said aqueous dispersion with a hydroxide of a metal having an atomic number greater than 19 and being selected from Group II–a of the Periodic Table; introducing said alkaline earth metal hydroxide into said aqueous dispersion of said refined pigment such that the molar ratio of the said hydroxide to said pigment is at least 1:1; subjecting said dispersion to hydrothermal treatment at a temperature in the range of from about 100°C to 200°C for a period of not less than one hour whereby said refined kaolin clay pigment is converted into an alumino-silicate pigment having a brightness of at least 10 to 12 points higher than that of said refined kaolin clay pigment employed as the starting material, and recovering the resulting product.

4. The method in accordance with claim 1 wherein said refined kaolin clay is a water fractionated kaolin and wherein said reaction period is not less than 4 hours and said molar ratio of said hydroxide to said pigment is from 4 to 5:1.

* * * * *